US012279095B2

(12) United States Patent
Aschoff

(10) Patent No.: US 12,279,095 B2
(45) Date of Patent: Apr. 15, 2025

(54) LANGUAGE-DEPENDENT ADJUSTMENT OF THE SIGNAL PROCESSING OF HEARING SYSTEMS

(71) Applicant: Sivantos Pte. Ltd., Singapore (SG)

(72) Inventor: Stefan Aschoff, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 18/800,302

(22) Filed: Aug. 12, 2024

(65) Prior Publication Data

US 2024/0406645 A1 Dec. 5, 2024

Related U.S. Application Data

(63) Continuation of application No. PCT/EP2024/053016, filed on Feb. 7, 2024.

(30) Foreign Application Priority Data

May 15, 2023 (DE) ..................... 10 2023 204 542.7

(51) Int. Cl.
*H04R 25/00* (2006.01)

(52) U.S. Cl.
CPC ............. *H04R 25/70* (2013.01); *H04R 25/30* (2013.01); *H04R 25/35* (2013.01); *H04R 25/50* (2013.01);
(Continued)

(58) Field of Classification Search
CPC ........ H04R 25/30; H04R 25/35; H04R 25/50; H04R 25/70; H04R 25/505; H04R 2225/39; H04R 2225/41
See application file for complete search history.

(56) References Cited

U.S. PATENT DOCUMENTS 7,206,416 B2 * 4/2007 Krause .................. H04R 25/70 704/271
7,742,611 B2 6/2010 Grafenberg et al.
(Continued)

FOREIGN PATENT DOCUMENTS

EP 1705951 A2 9/2006
WO 2014023340 A1 2/2014

OTHER PUBLICATIONS

Roy, A et al.: "Exploring the need for language-specific hearing aid signal processing", Journal of the Acoustical Society of America, vol. 152, No. 4, Oct. 1, 2022 (Oct. 1, 2022), p. A197, XP002811269, DOI: 10.1121/10.0016012.

*Primary Examiner* — Huyen D Le
(74) *Attorney, Agent, or Firm* — Laurence A. Greenberg; Werner H. Stemer; Ralph E. Locher

(57) ABSTRACT

Hearing systems have at least one hearing instrument which is parameterizable by means of a plurality of signal processing parameters. An initial setting of the signal processing parameters is performed in a test group of hearing systems and a final setting is derived after single or multiple changing of the parameter setting. A change vector in the parameter space is determined from the difference between the final setting and the initial setting. A language indicator characterizing a specific language is assigned to each change vector. From change vectors which are assigned to the same language or a language group a center of gravity of the change vectors in the parameter space is determined as the center of gravity of change. The center of gravity of change is used for a subsequent setting of the hearing systems in the test group or a further hearing system.

13 Claims, 2 Drawing Sheets

(52) U.S. Cl.
CPC ....... *H04R 25/505* (2013.01); *H04R 2225/39* (2013.01); *H04R 2225/41* (2013.01)

(56) References Cited

U.S. PATENT DOCUMENTS

| | | | | |
|---|---|---|---|---|
| 9,374,646 | B2 * | 6/2016 | Li | H04R 25/50 |
| 2014/0194775 | A1 * | 7/2014 | Van Hasselt | G16H 40/67 381/98 |

* cited by examiner

LANGUAGE-DEPENDENT ADJUSTMENT OF THE SIGNAL PROCESSING OF HEARING SYSTEMS

CROSS-REFERENCE TO RELATED APPLICATION

This application is a continuation, under 35 U.S.C. § 120, of copending International Patent Application PCT/EP2024/053016, filed Feb. 7, 2024, which designated the United States; this application also claims the priority, under 35 U.S.C. § 119, of German Patent Application DE 10 2023 204 542.7, filed May 15, 2023; the prior applications are herewith incorporated by reference in their entirety.

FIELD AND BACKGROUND OF THE INVENTION

The invention relates to a method for setting the signal processing of hearing systems which in each case have at least one hearing instrument. The invention further relates to an associated device for setting such hearing systems.

The term "hearing instrument" refers in general to an electronic device which supports the hearing of a person wearing the hearing instrument (who is referred to below as the "wearer" or "user"). The invention relates in particular to hearing instruments which are configured to compensate partially or fully for a loss of hearing of a user with impaired hearing. A hearing instrument of that type is also referred to as a "hearing aid" or a hearing device Hearing instruments also exist which protect or improve the hearing ability of users with normal hearing, for example which enable an improved understanding of speech in complex hearing situations. Hearing instruments of that type are also referred to as personal sound amplification products (PSAP).

Hearing instruments in general, and hearing devices and hearing aids in particular, are usually designed to be worn on the head and here, in particular, in or on an ear of the user, in particular as behind-the-ear devices, also referred to as BTE devices, or in-the-ear devices, also referred to as ITE devices.

In terms of their internal structure, hearing instruments normally have at least one (acoustoelectric) input transducer, a signal processing unit (signal processor) and an output transducer. During the operation of the hearing instrument, the or each input transducer records an airborne sound from the environment of the hearing instrument and converts this airborne sound into an audio input signal (i.e., an electrical signal which transports information relating to the ambient sound. The or each audio input signal is processed (i.e., modified in terms of its sound information) in the signal processing unit in order to support the hearing ability of the user, in particular to compensate for a loss of hearing of the user. The signal processing unit outputs a correspondingly processed audio signal to the output transducer. In addition, in some applications, the signal processing outputs the audio input signal in original or modified form to an external electronic device (peripheral device, e.g. a further hearing instrument or a smartphone of the user) and/or receives a further audio input signal from the peripheral device. In modern hearing instruments, data are normally transmitted wirelessly, e.g. using Bluetooth technology, between the hearing instrument and the peripheral device. Modern hearing instruments therefore often also comprise an antenna for the wireless transmission and reception of data.

In most cases, the output transducer is designed as an electroacoustic transducer which converts the (electrical)

audio output signal back into an airborne sound, wherein this airborne sound-modified in comparison with the ambient sound—is emitted into the auditory canal of the user. Electroacoustic transducers of this type are also referred to as "receivers."

A "hearing system" comprises at least one hearing instrument and, optionally, at least one further functional unit (in particular, at least one further electronic device and/or a software module) with which the hearing instrument interacts during operation. In the simplest case, the hearing system is therefore formed exclusively from the one hearing instrument itself. Alternatively, in addition to the one hearing instrument, the hearing system may comprise a further hearing instrument to supply the other ear of the user; this is also referred to as a "binaural hearing system." As an addition or alternative to the further hearing instrument, the hearing system comprises e.g. a remote control, an external programming device, an external data transmission interface to mediate a wireless data exchange between different data transmission standards, or an external microphone. Again additionally or alternatively, the hearing system comprises a software application (operating app) which is assigned to the hearing instrument and is installable or installed on a mobile device (e.g. a smartphone) or computer of the user and provides e.g. functions for the remote control and/or programming of the hearing instrument. In the last-mentioned case, the mobile device or computer of the user on which the operating app is installable or installed is itself not normally part of the hearing system. In particular, the mobile device or computer is normally manufactured and sold independently from the hearing system and is used merely as a resource for storage, computing services and possibly communication services.

Modern hearing systems normally have a signal processing which is settable by means of a multiplicity of (signal processing) parameters. The signal processing parameters normally comprise frequency-selective amplification factors which are adjusted—in the case of hearing devices—in order to fully or partially compensate for an individual loss of hearing of the user. Further parameters determine, for example, the characteristics of a directional sound reception (beamforming), a dynamic compression, a spectral compression or frequency shift, an interfering noise suppression or feedback suppression, a "sound smoothing" (i.e., an "acoustic edge smoothing," which removes the interference peaks from the acoustic signal), if necessary a binaural signal processing, etc. These parameters are normally set individually for each user in order to adjust the signal processing of the hearing system to the particular needs of the user. This adjustment is also referred to as "fitting" or "fit."

The fitting of a hearing system generally begins by measuring an audiogram (i.e., a spectrally resolved analysis of the hearing ability) of the user and a subsequent standardized initial setting ("first fit") which calculates the frequency-dependent amplification factors on the basis of the audiogram. A selection of standardized calculation formulae (e.g. DSL I/O, NAL-NL2, etc.) are available for this purpose. For the first fit, a fitting station, i.e., a computer system with an adjustment program installed thereon, is connected to the, or to each, hearing instrument of the hearing system and sets the, or each, hearing instrument according to the calculated amplification factors. Standardized initial settings are frequently also made for further signal processing parameters (in particular those which influence compression behavior).

However, the fitting process does not normally end here. Instead, an experienced acoustician normally performs a fine adjustment or readjustment, wherein he incorporates various characteristics of the individual user, such as the ability to understand speech, which he relates e.g. to the hearing loss of sounds (i.e., to the sound audiogram). At the request of the user who desires a better understanding of speech, the acoustician can, for example, readjust the amplification and/or compression behavior (type, point of use, strength) for individual frequency ranges. In addition, he has the facility to activate or change further signal processing algorithms for which the standard calculation formulae provide no information (e.g. the strength and the dynamic adjustment behavior of the beamforming).

Such readjustments are already anticipated in many cases by the manufacturers of hearing systems and are available as "hearing programs" for generally known, typical hearing situations: office, television, automobile, outdoor, etc.

Once the user has received the initially set hearing instrument from the acoustician for the first time, he familiarizes himself with its operation and also with the new hearing sensations during a familiarization phase in daily use. In most cases, three or four readjustment appointments are made, in which the parameter setting is finely adjusted by the acoustician. In the readjustment sessions, the acoustician helps not only with queries relating to the operation of the hearing instrument, but also with problems relating to the understanding of speech. From the wide-ranging signal processing setting options, he can then perform corresponding settings which, if necessary, are even more finely adjusted in further sessions.

SUMMARY OF THE INVENTION

It is accordingly an object of the invention to provide a method and a device which overcome the above-mentioned disadvantages of the heretofore-known devices and methods of this general type and which provide for an effective, but at the same time also a simplified, method and an associated device for adjusting the signal processing (fitting) of hearing systems.

With the above and other objects in view there is provided, in accordance with the invention, a method for setting the signal processing of hearing systems, wherein each of the hearing systems has at least one hearing instrument that is parameterizable by way of a plurality of signal processing parameters, the method comprising:

- carrying out an initial setting of the signal processing parameters in the hearing systems within a test group of the hearing systems;
- deriving a final setting of the signal processing parameters in each of the hearing systems within the test group through single or multiple changing of the parameter setting;
- determining a change vector in a parameter space defined by the signal processing parameters from a difference between the final setting and an initial setting of the signal processing parameters;
- assigning a language indicator characterizing a specific language to each change vector;
- from change vectors which are assigned in accordance with the associated language indicator to the same language or to a language group containing that language, determining a center of gravity of these change vectors in the parameter space as a center of gravity of change; and
- using the center of gravity of change for a subsequent setting of one of the hearing systems in the test group or a further hearing system.

The invention deals with a number of hearing systems which in each case have at least one hearing instrument. Each of the hearing systems and the respective at least one associated hearing instrument are designed, in particular, according to one of the models or types described above.

A parameter set P of signal processing parameters $p_i$ (where i=1, 2, 3, . . . , n), for example, is assigned in each case to the hearing instruments of the hearing systems, wherein these signal processing parameters $p_i$ determine the type and function of the respective hearing instrument (and therefore of the hearing system as a whole). The number n of signal processing parameters $p_i$ is, for example, more than one hundred (n>100), in particular more than two hundred (n>200).

During the parameter setting of each hearing system, a specific value is generally allocated to each signal processing parameter $p_i$ of the or of each assigned hearing instrument. For each signal processing parameter $p_i$, the parameter set P determined in this way therefore contains the respectively allocated value, e.g. a whole-number value (integer) or a floating-point value within a respectively predefined range, a binary value, etc. From a mathematical point of view, each parameter set P consequently represents a vector ($P=\{p_i\}=\{p_1, p_2, p_3, \ldots, p_n\}$) in an n-dimensional parameter space defined by the signal processing parameters $p_i$.

The invention is based on the consideration that, during the adjustment of a hearing system, in particular during the initial setting (first fit), it is advantageous to take into account, if necessary along with other criteria, such as, in particular, the audiogram of the user (or comparable variables characterizing the hearing ability of the user), a specific language (in particular the native language of the user or the language spoken at the place of residence of the user), and therefore to vary the parameter adjustment depending on this language.

The afore-mentioned initial setting $P_{in}$ describes the initial/first definition of the parameter set P which is normally undertaken by the acoustician when the hearing system is handed over to the user. The initial setting $P_{in}$ is therefore a specific characterization of the parameter set P, i.e., similarly a vector in the parameter space of the signal processing parameters $p_i$ ($P \rightarrow P_{in}$).

An initial setting which already takes into account a specific language (i.e., in particular, the language which the user himself speaks or hears) evidently has the potential to achieve particularly good speech intelligibility in the signal that is output by the hearing system, even from the start of use of the hearing system (and not e.g. only after a plurality of readjustment appointments). The reason for this is that different languages differ in some cases significantly in the respective pronunciation in terms of their respective sound distribution and frequency distribution. The perception of different languages can therefore be better or worse in the case of a given hearing loss-regardless of any language knowledge that the user may have.

There are, for example, tonal languages, such as e.g. Chinese languages, in which a change in the pitch or the pitch characteristic in a syllable is often associated with a change in the meaning of the corresponding word (or morpheme), and non-tonal languages, such as e.g. German, in which the pitch or the pitch characteristic in a syllable has no influence on the meaning of the word. However, even non-tonal languages already have very different characteristics. There are, for example, vowel-rich or consonant-rich languages. Even a single language, such as e.g. Portuguese, can be articulated phonetically and also with the many vowels of the language in one country, Brazil, whereas, in another country, Portugal, the pronunciation is 'slurred' and vowels are in many cases 'swallowed', so that this language appears (particularly to outsiders) as a consonant-rich language. Slavic languages, such as e.g. Polish, are frequently richer in sibilants than e.g. German. In Arabic in turn, there are many voiceless fricatives (i.e., aspirants which are produced due to the constriction of the place of articulation and the air flowing through this constriction), which are relevant to the understanding of speech. For these reasons, the spectral center of gravity (i.e., the mean value of the sound frequencies occurring in a language) is sometimes substantially different in different languages. The spectral center of gravity in Italian, for example, is on average around one third higher than in German. Similarly, the spectral center of gravity in Eastern European languages is higher than in Western European languages.

It is evidently advantageous for speech intelligibility if the language spoken or heard by the user is taken into account in setting the signal processing of a hearing system, since the frequency ranges or frequency distributions that are important for the understanding of speech in the respective language can therefore be given greater consideration. Furthermore, differences in compression behavior can also influence speech intelligibility. In particular, signal processing settings which result in greater emphasis or less distortion of specific phonemes of a language can significantly improve speech understanding for the user of the hearing system.

However, it has hitherto proven difficult to precisely calculate or predict effects of a modified signal processing on the understanding of speech in specific languages. A method and an associated device which enable automatic and model-free consideration (i.e., not based on fundamental assumptions or scientific models) of a language dependence in the adjustment of the signal processing of a hearing system are therefore indicated by the invention.

In the method according to the invention, an initial setting $P_{in}$ (also referred to as an initial adjustment or "first fit") of the signal processing parameters is performed in each case on hearing systems in a test group of hearing systems. The initial setting of the hearing systems in the test group is performed, in particular, in a conventional manner, for example using a known standardized method, such as e.g. DSL I/O, NAL-NL2 or a variant thereof. The initial setting performed on the hearing systems in the test group is, in particular, language-independent, i.e., is not designed specifically for a certain language, or is at least not varied for different languages. The test group preferably consists of identical hearing systems or at least of hearing systems which have identical or comparable hearing instruments, in particular hearing instruments having the same set of signal processing parameters. The test group preferably comprises a statistically significant number of hearing systems, e.g. several hundreds, thousands or tens of thousands of hearing systems.

In a time period following the initial setting-insofar as, in particular, this is similarly also performed in a conventional manner-a final setting $P_{end}$ of the signal processing parameters is derived in the case of each of the hearing systems in the test group through single or multiple changing (fine adjustment or readjustment) of the initial setting. The aforementioned final setting describes the terminating/last definition of the parameter set P in the course of the fitting process, the definition normally being carried out in turn by the acoustician at the end of a hearing system familiarization phase and then being retained permanently or at least for a lengthy time period. The final setting Pend is therefore similarly a specific characterization of the parameter set P, i.e., similarly a vector in the parameter space of the signal processing parameters $p_i$ ($P \rightarrow P_{end}$).

A change vector D in the parameter space defined by the signal processing parameters is then determined from the difference between the final setting and the initial setting of the signal processing parameters for each hearing system in the test group. From a mathematical point of view, this change vector D is also a vector in the parameter space of the signal processing parameters $p_i$. The final setting Pend is derived arithmetically from the vector sum of the initial setting $P_{in}$ and the change vector D ($P_{end}=P_{in}+D$).

A language indicator characterizing a specific language is assigned to each change vector D. The language indicator can specify a language directly (e.g. "German," "English," "Mandarin," etc.). Alternatively, it can also characterize the language by indicating a country, a part of a country or region (e.g.: "Germany," "Catalonia," "Bavaria," etc.). Different languages can also be characterized in turn by numbers or other identification codes. Different dialects ("upper Bavarian"), or variations of a language (e.g. "Iberian Portuguese" and "Brazilian Portuguese" can be regarded according to the invention-depending on the embodiment thereof-either as different "languages" or as one and the same language. The language indicator is specified, for example, by the user or by an acoustician, for example by means of an operating app of the hearing system or by a fitting station. The language indicator can alternatively be assigned automatically according to the invention, for example on the basis of a geographical location at which the initial setting of the hearing system is performed. The language indicator is preferably assigned in such way that it is characteristic of the language which the user predominantly hears or which he speaks.

In a first variant of the method according to the invention, a center of gravity of these change vectors in the parameter space is determined from change vectors D which are assigned according to the associated language indicator to the same language. This center of gravity of the change vectors, also referred to below as the "center of gravity of change $\langle D \rangle$," is therefore normally determined in each case separately for each language. However, in a further variant of the method according to the invention, change vectors for a plurality of similar languages which are assigned to a common language group for the purpose of this analysis are taken into account in calculating the center of gravity of change. Change vectors of hearing systems of Italian and Spanish users, for example, can be evaluated together in order to determine a common center of gravity of change.

A multidimensional mean value of the change vectors D that are taken into account is designated as the center of gravity (of change) $\langle D \rangle$, e.g. according to $$\langle D \rangle = \frac{1}{m} \sum_{j=1}^{m} D_j$$

wherein the counting index j (where j=1, 2, 3, . . . , m) runs over the change vectors Dj taken into account in calculating the center of gravity of change, and m designates the number of these change vectors $D_j$ that are taken into account. From a mathematical point of view, the center of gravity of change $\langle D \rangle$ is also a vector in the parameter space of the signal processing parameters $p_i$.

The center of gravity of change determined for a specific language is finally used for a subsequent setting of at least one of the hearing systems in the test group or at least one further hearing system, in particular by changing a previous parameter set P by the center of gravity of change ⟨D⟩ ($P_{old}$+⟨D⟩→$P_{new}$). The respective hearing system is thereby adjusted in a language-specific manner.

In one preferred application, the center of gravity of change is taken into account during the initial setting of a new hearing system by modifying a non-language-specific initial setting of the hearing system (e.g. according to DSL I/O, NAL-NL2 or a variant thereof) by the center of gravity of change that was previously determined for the language which is selected (e.g. by the user or by an acoustician) for the hearing system concerned.

In a further application, the center of gravity of change is taken into account in a language-specific hearing program which is reversibly activatable and deactivatable automatically or by the user during the operation of the hearing system. A "language" hearing program, for example, which is itself also frequently present in conventional hearing systems, is adjusted according to the invention by applying the change vector concerned to a specific language, e.g. English. The user can activate this adjusted "language" hearing program, particularly in alternation with other hearing programs such as "music," "office," etc.

In particular, a plurality of hearing programs which are assigned in each case to different languages and which are activatable automatically or by the user in alternation (with one another or with further hearing programs) during the operation of the system are optionally stored in the hearing system The user can choose here, for example, between the hearing programs "language (German)," "language (English)," "music," "office," etc. In a further embodiment, a hearing program which is adjusted specifically to the language spoken in each case in the environment of the user is activated automatically by the hearing system on the basis of an automatic language detection or an automatic (geographical) location detection. Language-specific hearing programs of this type can optionally also be generated dynamically during the operation of the hearing system on the basis of a language-independent default setting and the center of gravity of change specific to the respective language.

In one advantageous embodiment of the invention, only those change vectors that are based on identical or similar initial settings of the signal processing parameters are taken into account in calculating the center of gravity of change. In this embodiment of the invention, the center of gravity of change is therefore determined not only specifically for a certain language, but, in addition, specifically for a certain type of initial setting also (and therefore, in the case of hearing devices, in particular specifically for a certain type of hearing impairment).

In a further advantageous embodiment of the invention, in addition to the language indicator, at least one indicator of a user characteristic is assigned to each change vector. Only those change vectors which correspond in the or in each assigned user characteristic are in turn preferably taken into account in calculating the center of gravity of change. The center of gravity of change is therefore determined here in addition specifically for users having at least one common user characteristic.

The at least one user characteristic is, in particular:

an indicator of the age of the user, an indicator of the gender of the user, and/or an indicator of a musical training/experience of the user.

The reasoning behind the indicator of a musical training of the user is that musicians and music lovers normally have a trained ear and therefore-even with identical physical hearing ability—have a different perception of sound and noise compared with users with no musical training/experience. Musicians or music lovers therefore often require particular parameter settings for a satisfactory hearing experience.

If the invention is applied to hearing systems for users with damaged hearing, an indicator of the time period of an untreated hearing loss of the user before the use of a hearing system (untreated time period) is preferably taken into account as a user characteristic (possibly as an alternative or in addition to at least one other user characteristic). The reasoning behind the indicator of the untreated time period is that a hearing loss that is untreated (i.e., not fully or partially compensated by a hearing system) results in a gradual degeneration of the understanding of speech as time progresses, since the brain forgets how to understand speech. Even after the start of treatment, this loss of speech understanding is often not remediable, or is remediable to a small extent only. Users whose hearing loss has been untreated for a long time period therefore normally require a different parameter setting compared with users untreated for a short time period—even if the physical hearing loss is identical.

The or each center of gravity of change is preferably used in a subsequent setting of one of the hearing systems in the test group or a further hearing system only if the center of gravity of change meets at least one specific quality criterion.

According to a first quality criterion, a check is carried out to determine the extent of the change in the signal processing parameters brought about by the center of gravity of change and, in particular, to establish that the center of gravity of change does not fall below a predefined minimum threshold. In a preferred embodiment of the invention, the or each center of gravity of change is used only in this case in a subsequent setting of one of the hearing systems in the test group or a further hearing system. In this way, parameter changes which would be inconsequential or insignificant due to their minor nature are avoided. In different variants of the invention, the at least one minimum threshold can be defined in relation to only one signal processing parameter, in relation to a selected group of signal processing parameters, or in relation to all signal processing parameters. A weighted amount of the center of gravity of change, for example, is determined and the center of gravity of change is used in a subsequent setting of one of the hearing systems in the test group or a further hearing system only if the weighted amount exceeds a predefined minimum value.

The weighted amount ⟨D⟩|w of the center of gravity of change ⟨D⟩ is determined, for example, according to $$|\langle D\rangle|_w = \sqrt{\sum_{i=1}^{n}(x_i d_i)^2}$$

where di are the components of the vectorial center of gravity of change (⟨D⟩={$d_1$, $d_2$, $d_3$, . . . , $d_n$}) and xi are empirically defined weighting or scaling factors.

According to a second quality criterion, a dispersion (in particular a statistical variance) of the change vectors taken into account in determining the center of gravity of change is calculated. The center of gravity of change is used for a subsequent setting of one of the hearing systems in the test group or a further hearing system only if the dispersion does not exceed a predefined maximum value. In this way, parameter changes which would be inconsequential or insignificant due to excessive dispersion of the individual change vectors are avoided.

The respective initial setting $P_{in}$, the respective final setting $P_{end}$ and the language indicator are preferably stored in a central database, in particular in a cloud memory (data cloud) for all hearing systems in the test group. The change vector D assigned in each case to each hearing system in the test group is preferably calculated in a cloud server. In an alternative embodiment of the invention, the change vectors are determined within the respective hearing system or in a fitting station of the acoustician and are fed to a central database.

The final setting $P_{end}$ of the signal processing parameters assigned in each case to each hearing system in the test group is preferably determined automatically on the basis of the timing of the successive parameter adjustment. The respective current setting of the signal processing parameters is adopted as the final setting, in particular for each hearing system in the test group, if this current setting undergoes no further modification over a predefined time period (of e.g. two months).

In order to prevent corruption of the analysis of the change vectors due to unsuccessfully performed parameter adjustments, the adoption of the final setting, the calculation of the change vector or the consideration of the change vector in the calculation of the center of gravity of change are optionally made dependent on a quality control in each data set assigned to a hearing system. The final setting is adopted or the change vector is calculated or taken into account in calculating the center of gravity of change only if at least one quality criterion is satisfied, in particular:

- if at least a minimum number of parameter adjustments (fine adjustments) have been carried out between the initial setting and the final setting, and/or
- if a speech audiometry test has been carried out in each case after the initial setting and after the final setting and these tests reveal a significant improvement in speech understanding (in particular exceeding a predefined threshold value).

A standard test established for checking speech understanding, e.g. the "Oldenburg sentence test" for the German language, is preferably used as a speech audiometry test. In the test, for example, the limit sound level is determined at which the user is still able to understand a predefined proportion (e.g. 50%) of spoken words or sentences. In this case, the improvement in speech understanding is determined on the basis of the reduction in the limit sound level between the test after the initial setting and the test after the final setting. The speech audiometry tests can be carried out fully automatically or under the guidance of an acoustician. In the latter case, the values for the limit sound level can also be entered manually by the acoustician and can therefore be assigned to the data set of the respective hearing system.

As an alternative or in addition to the performance of a scientifically standardized test (e.g. the afore-mentioned Oldenburg sentence test), other options for measuring speech understanding can also be considered. Thus, according to the invention, questionnaires, for example, can be used which provide the hearing device wearer with questions and answers to be selected (e.g. indication of a degree of speech understanding in broadcast news, in particular divided into male and female voices; indication of a degree of effort in understanding broadcast news; indication of a degree of speech understanding and/or speech effort in conversations in quiet places with few speakers; etc.).

The results of such questionnaires may possibly have a greater dispersion than the results of a scientific test, since the ambient conditions in everyday life vary more significantly than defined laboratory conditions such as those normally used for scientific tests. Questionnaires can nevertheless also have results with acceptable variance/dispersion which can be used advantageously according to the invention.

Furthermore, speech understanding tests according to the invention can also be carried out automatically by means of a peripheral device of the hearing device or an assigned operating app. Audio files, for example, which the user downloads via the operating app and runs via the hearing instrument can be provided for this purpose on the cloud-based server. The operating app can, for example, adjust the volume to a level suitable for the user, or can even vary the level and therefore output speech at a defined volume. The performance of the speech understanding test controlled by means of the operating app can emulate, for example, the Oldenburg sentence test. The user is initially instructed, for example, to find a quiet environment for the performance of the test. After the start of the test, audio files are reproduced by the operating app at a volume which is readily perceptible to the hearing device wearer. The hearing device wearer repeats the sentences that he has heard. The repeated sentences are recorded by the hearing instrument or by a smartphone microphone and are analyzed either offline in the app or online on the cloud server by means of speech recognition software. The proportion of correctly reproduced words is determined on the basis of this analysis. If the proportion of correctly reproduced words is high (in particular exceeds a predefined threshold value), the sound level is reduced slightly for the next run. Conversely, if the proportion of correctly reproduced words is low (in particular falls below a further threshold value), the sound level is increased slightly for the next run. The set sound level converges here with a value to be determined as the test result.

One advantage of the app-controlled performance of the speech understanding test is that speech understanding tests can be performed in this way with relatively little effort and in large numbers. As a result, it is also simpler to record changes in speech understanding over time (e.g. due to increasing signs of ageing, progressive illnesses or medication intake) through multiple repetition of the speech understanding tests on the same user.

The device according to the invention for setting the signal processing of hearing systems comprises, in a narrower sense, at least one (first) adjustment unit which is configured to perform the initial setting of the signal processing parameters described above in the hearing systems in the test group of hearing systems described above. The adjustment unit is further configured to perform the final setting of the signal processing parameters described above in each hearing system in the test group, wherein the final setting is derived from the initial setting through single or multiple changing of the signal processing parameters of the respective hearing system. The adjustment unit can be implemented according to the invention as part of any hearing system, e.g. as a function of an operating app by means of which the user himself can, for example, perform the initial setting of the hearing system and the at least one readjustment of this initial setting. In this case, the adjustment unit is therefore formed from a plurality of subunits distributed among the individual hearing systems. However, the device preferably comprises one or more fitting stations operated in each case by an acoustician as adjustment units, i.e., computers with fitting software installed thereon, to which the hearing instruments of the hearing systems can be connected in order to adjust the signal processing parameters. These fitting stations are disposed, for example, on the premises of acousticians who are visited by the users of the hearing systems in the test group in order to adjust the signal processing parameters. In a further preferred embodiment, the adjustment unit is implemented as a central unit, e.g. in the form of a cloud server, which has a data transmission connection to all hearing systems in the test group, e.g. via the Internet.

The device further comprises an evaluation unit for determining the change vectors described above and for determining the language-specific center of gravity of change described above. The evaluation unit preferably comprises a central server, in particular implemented in a data cloud, with evaluation software installed thereon. However, parts of the evaluation unit, e.g. software modules for determining the change vectors, can also be implemented in specific embodiments of the invention in the hearing systems (e.g. as a function of an operating app) or in the fitting stations.

Furthermore, in a broader sense, the hearing systems in the test group also form parts of the device.

The or each first adjustment or a further (second) adjustment unit of the device is finally configured to use the center of gravity of change in a subsequent setting of one of the hearing systems in the test group or a further hearing system.

The device according to the invention is generally configured to carry out the method according to the invention automatically. Embodiments of the method therefore correspond to equivalent embodiments of the device, so that the above explanations of embodiments of the method can also be transferred accordingly to the device, and vice versa.

In summary, the invention is based on the idea of:

- indicating a method with which a check can be carried out to determine whether hearing device fine adjustments which are carried out in practice have language-specific deviations from an initial standard setting, and
- using such identified, language-specific deviations, if necessary following a successful check for quality or significance, for automated adjustments of the signal processing parameters, in particular initial settings (first fits).

In one exemplary embodiment for the implementation of the method according to the invention, a central database is provided, e.g. as a cloud-based solution, in which a multiplicity of initial settings of hearing systems are stored together in each case with an assigned language indicator. Alternatively and equivalently, hearing loss measurement data (in particular audiogram data) of the respective user and an indication of the standard method for creating the initial setting are stored in the central database for each hearing system, and the initial setting values are reconstructed therefrom.

Parameter values which have been modified during readjustments are then also stored in the central database. If the data set assigned to a hearing system has undergone no further modification over a predefined time period of e.g. two months following some readjustments, this is regarded as an indicator that the readjustment is completed; i.e., the last parameter settings updated and stored in the central database are regarded as the final setting of the hearing system.

If the initial setting, the final setting and the language indicator are present in the central database for a larger test group of hearing systems, the data are subjected to an analysis by a cloud server acting as an evaluation unit.

From each data set, the assigned change vector is calculated from the difference between the final setting and the initial setting. Vividly described, the change vectors assigned to the same language represent a point cloud (i.e., a cluster in the n-dimensional parameter space of the signal processing parameters). The center of gravity of change, i.e., the cluster center, is calculated from the change vectors.

The points of the cluster, i.e., the change vectors that are taken into account, are further examined for homogeneity, i.e., the 'cluster quality" is calculated. In the example shown here, the cluster quality calculation comprises:

- the calculation of a weighted amount of the center of gravity of change and the comparison of this amount with a predefined minimum value in order to ensure that the center of gravity of change is not too small, i.e., actually represents a perceptible effect, and
- the calculation of the dispersion (i.e., the statistical variance) of the change vectors that are taken into account around the center of gravity of change and the comparison of this dispersion with a predefined maximum value in order to ensure that the dispersion is not too great in comparison with the amount of the center of gravity of change; if the dispersion is too great, the center of gravity of change is not meaningful for further use.

If at least one of the cluster quality criteria is fulfilled, i.e., if the weighted amount of the center of gravity of change exceeds the minimum value and/or the dispersion falls below the maximum value, the previously determined center of gravity of change is used in future initial settings of new hearing systems of which the users have the same language. Alternatively, the previously determined center of gravity of change is used in future initial settings of new hearing systems (having the same assigned language or language group) only if both cluster quality criteria are fulfilled.

Consideration of the center of gravity of change means specifically that, following the standardized initial setting (such as e.g. DSL I/O, NAL-NL2 or a vendor-specific default initial setting), the values of the signal processing parameters thus obtained are modified by the values of the center of gravity of change. The path that the user typically follows through to the final conclusion of the fine adjustment is thereby shortened.

Other features which are considered as characteristic for the invention are set forth in the appended claims.

Although the invention is illustrated and described herein as being embodied in a language-dependent adjustment of the signal processing of hearing systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Matching parts and variables are denoted with the same reference numbers throughout the figures.

DETAILED DESCRIPTION OF THE INVENTION

Figure 1:
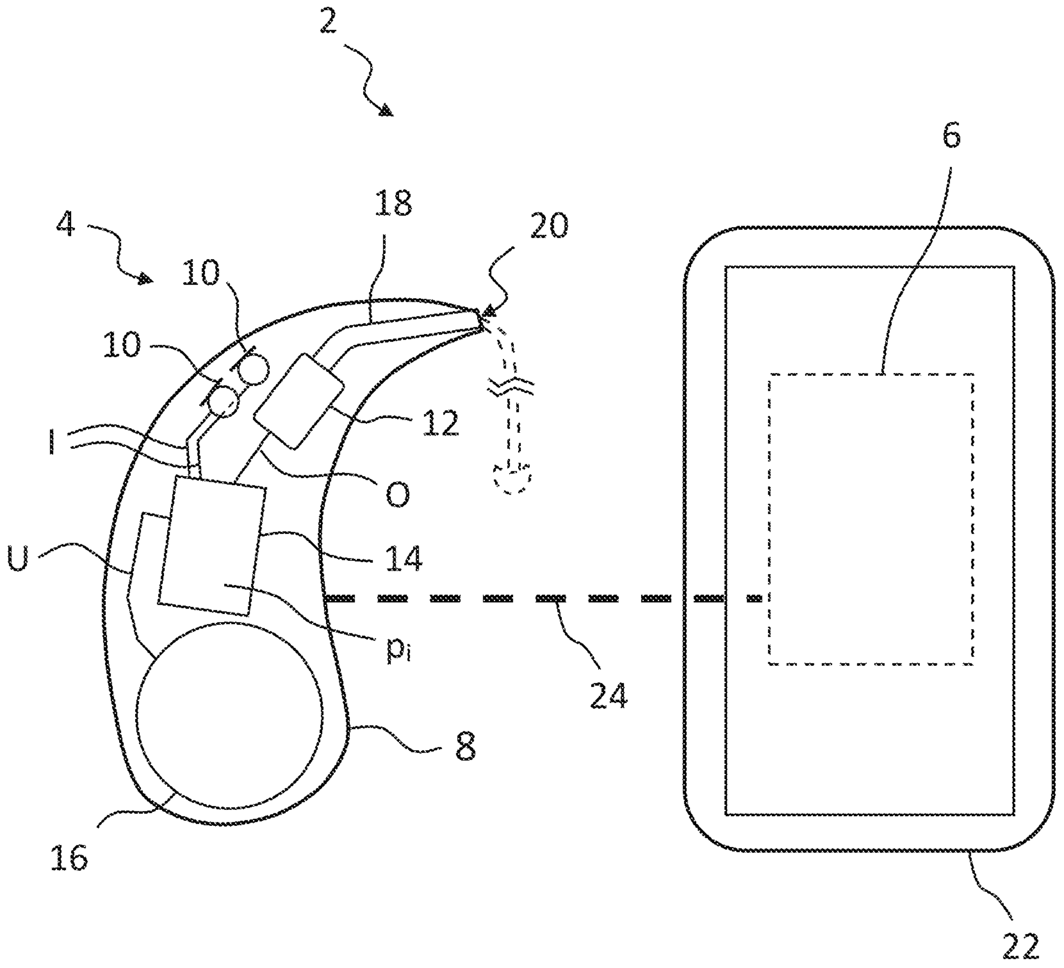
FIG. 1 shows a schematic view of a hearing system having a hearing instrument which is parameterizable by means of a plurality of signal processing parameters, and having an assigned software application which has a data transmission connection to the hearing instrument for the remote control and configuration of the hearing instrument (operating app) and which is installed on a smartphone of the user of the hearing system.

Referring now to the figures of the drawing in detail and first, in particular, to FIG. 1 thereof, there is shown a rough, schematic view of a hearing system 2 which is formed of a hearing instrument 4 and an associated software application (operating app 6).

The hearing instrument 2 is, by way of example, a hearing aid, i.e., a hearing device that is configured to support the hearing ability of a user with impaired hearing. In the embodiment shown here, the hearing instrument 2 is designed as a BTE device (BTE-behind the ear). It therefore comprises a housing 8 which is worn for its intended purpose behind an ear of a user, and an earpiece (indicated in dashed lines) which is inserted for its intended purpose into the auditory canal of the user. The hearing instrument 2 further comprises a sound tube (indicated in dashed lines) which mechanically connects the housing 8 to the earpiece.

Inside a housing 8, the hearing instrument 4 has the following components:

- at least one microphone 10 (in the example shown, two microphones 10) as an acoustoelectric input transducer,
- a loudspeaker also referred to as a receiver 12 as an electroacoustic output transducer,
- a (in particular digital) signal processor 14, and
- a battery 16.

The hearing instrument 4 further has a wireless communication device (not shown in detail) for the data exchange with the operating app 6, e.g. in the form of a Bluetooth transceiver.

During the normal operation of the hearing instrument 4, the microphones 10 in each case record an airborne sound from the environment of the hearing instrument 4. The microphones 10 convert the sound into an audio (input) signal I, i.e., into an electrical signal containing information relating to the recorded sound. The respective audio input signal I is fed within the hearing instrument 4 to the signal processor 14 which modifies this audio input signal I in order to support the hearing ability of the user, in particular amplifies it in a frequency-selective manner to compensate for a loss of hearing of the user. The function of the signal processor 14 is variably configurable by means of a multiplicity of signal processing parameters $p_i$.

The signal processor 14 outputs the modified audio signal (audio output signal O) to the receiver 12. The audio output signal O is an electrical signal containing information relating to the processed and therefore modified sound. The receiver 12 converts the audio output signal O in turn into an airborne sound which is fed via a sound channel 18 to a tip 20 of the housing 8. The airborne sound output by the receiver 12 is fed from there by means of the sound tube to the earpiece and is emitted there into the auditory canal of the user.

The signal processor 14 and all further electrical or electronic components of the hearing instrument 4 are supplied from the battery 16 with a DC electric voltage referred to as the operating voltage U.

The operating app 6 is used, in particular, for the remote control and programming of the hearing instrument 4. During the operation of the hearing system 2, the operating app 6 is installed in executable form on an (in particular mobile) computer. In the example shown, this computer is a smartphone 22 of the user. The computer, in particular the smartphone 22, is itself not part of the hearing system 2, but is used by the operating app 6 only as an external resource for computing power, storage space and communication services. In particular, the operating app 6 accesses a wireless communication device (not shown in detail), in particular a Bluetooth transceiver, of the smartphone 22 in order to exchange data with the hearing instrument 4 via a wireless data communication connection 24. The operating app 6 further serves-using the smartphone 22—also as a mediator for the data exchange between the hearing instrument 4 and the mobile radio network and the Internet, e.g. in order to use the hearing instrument 4 to make telephone calls and to load updates of the firmware of the hearing instrument 4 or configuration data (in particular values for the signal processing parameters $p_i$) and run them on the hearing instrument 4.

Figure 2:
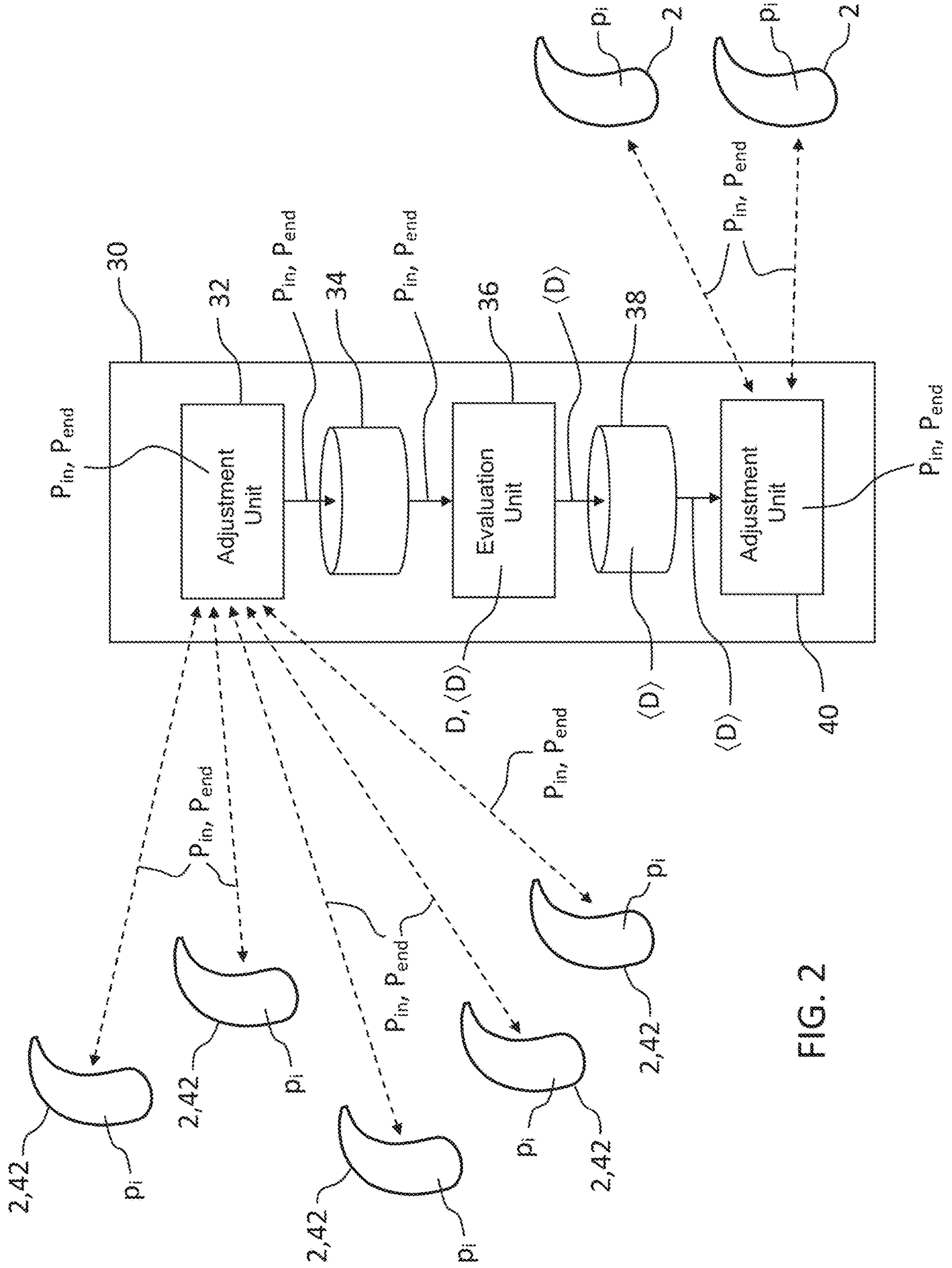
FIG. 2 shows a schematic view of a device for setting the signal processing of hearing systems.

FIG. 2 shows a device 30 for setting the signal processing of hearing systems 2, which are, for example, hearing systems 2 of the type shown in FIG. 1.

The device 30 comprises a first adjustment unit 32, a (setting) database 34, an evaluation unit 36, a (speech adjustment) database 38 and a second adjustment unit 40. In one preferred implementation, the adjustment units 32 and 40 and the evaluation unit 36 are implemented as cloud servers, and the databases 34 and 38 as cloud storage devices. The adjustment units 32 and 40 have a data transmission connection here via the Internet to the hearing systems 2 which are to be adjusted (in particular through the mediation of a mobile radio connection).

The first adjustment unit 26 has the function of an intrinsically conventional fitting station which performs an individual adjustment, independent from the (spoken or typically heard) language of the user, of the hearing systems 2 in a test group 42 according to the needs of the respective user. The test group 42 preferably comprises a statistically relevant number of hearing systems 2, e.g. several hundreds, thousands or tens of thousands of hearing systems 2.

During the adjustment process (fitting process) carried out by the adjustment unit 32, the adjustment unit 32 creates a first parameter set of the signal processing parameters $p_i$, referred to below as the initial setting $P_{in}$, for each of the hearing systems 2 in the test group 42 on the basis of audiogram data which characterize the hearing ability of the user of the respective hearing system 2. The adjustment unit 32 uses, in particular, a conventional adjustment model, e.g. DSL I/O or NAL-NL2, for this purpose. Following the creation, the adjustment unit 32 transfers the initial setting $P_{in}$ to the respective hearing system 2 which configures its signal processing accordingly.

The user therefore begins to use the respective hearing system 2 in the test group 42 with the initial setting $P_{in}$ predefined by the adjustment unit 32. During a familiarization phase following the start of use, the initial setting $P_{in}$ is modified by the adjustment unit 32 in one or more fine adjustment steps on the basis of feedback from the user relating to hearing sensation problems and/or on the basis of listening comprehension tests. The modifications can either be predefined manually by an acoustician operating the adjustment unit 32, or can be determined automatically by the adjustment unit 32. In both cases, the adjustment unit 32 creates a parameter set containing the modified signal processing parameters $p_i$ in each fine adjustment step (intermediate setting) and transfers it to the respective hearing system 2 which in turn configures its signal processing accordingly. The adjustment unit 32 stores the number of fine adjustment steps for each hearing system 2 in the test group 42.

The adjustment unit 32 ends the familiarization phase when a predefined condition is met, e.g. when a predefined command is input by the user or acoustician, when a predefined time period has elapsed since the start of use, or after a predefined number of fine adjustment steps. It can further be provided that the adjustment unit 32 automatically ends the familiarization phase if no further fine adjustment is performed over a predefined time period (of e.g. two months). In all cases, at the end of the familiarization phase, the adjustment unit 32 stores the last-created intermediate setting as the final setting $P_{end}$ in the setting database 34 together with the associated initial setting $P_{in}$, the number of fine adjustment steps and a language indicator, for each system 2 in the test group 42. The language indicator preferably characterizes the language which the user of the respective hearing system 2 predominantly speaks or hears. A listening comprehension test (e.g. an "Oldenburg sentence test") is preferably carried out in each case by means of the adjustment unit 32 for each hearing system 2 at the start of use and at the end of the familiarization phase. In this case, the adjustment unit 32 determines the improvement in the listening comprehension of the user during the familiarization phase on the basis of the comparison of the test results, and similarly stores this information in the setting database 34.

Optionally, the adjustment unit 32 additionally records one or more of the following information elements for each hearing system 2 in the test group 42:

- age of the user
- gender of the user
- type and/or severity of the hearing loss
- untreated time period (i.e., time period of the existence of an untreated hearing loss before the start of use of the hearing system 2),
- musical training (and therefore implicitly training of the hearing).

The evaluation unit 36 determines language-specific centers of gravity of change ⟨D⟩ in the signal processing parameters $p_i$, i.e., average changes in the signal processing parameters $p_i$ for individual languages or for language groups of similar languages, in a language-specific evaluation on the basis of these data stored in the setting database 34. The evaluation unit 36 preferably carries out this language-specific evaluation described in detail below for the first time when a predefined minimum number (e.g. 100) of final settings $P_{end}$ are stored in the setting database 34. The language-specific evaluation is preferably repeated according to predefined criteria (e.g. at regular time intervals or in each case following the storage of a predefined number of further final settings $P_{end}$ in the setting database 34). The language-specific evaluation is preferably always carried out with each repetition for all languages or language groups. Alternatively, this evaluation is carried out and repeated separately for different languages or different language groups.

For all stored final settings $P_{end}$ (and therefore for each hearing system 2 in the test group 42)—or in any case for each stored final setting $P_{end}$ of the corresponding language or language group—the evaluation unit 36 in each case determines a change vector D here which in each case reflects the difference between the associated values of the final setting $P_{end}$ and the initial setting $P_{in}$ for each signal processing parameter $p_i$. The change vector D which is derived mathematically from the vector subtraction of the final setting $P_{end}$ and the initial setting $P_{in}$ ($D=P_{end}-P_{in}$) therefore reflects the change which the signal processing parameters $p_i$ of the respective hearing system 2 have undergone during the familiarization phase. The evaluation module 36 preferably stores the determined change vectors D in the setting database 34 so that these change vectors D do not have to be determined once again when the language-specific evaluation is repeated.

In a following step of the language-specific evaluation, the evaluation unit 36 determines the centers of gravity of change ⟨D⟩ for the respective language or language group by means of averaging over the change vectors D determined for a specific language or language group. In certain design variants, it can be provided that the evaluation unit 36 uses all change vectors D stored for the respective language or language group in order to determine the center of gravity of change ⟨D⟩. However, in order to improve the meaningfulness of the centers of gravity of change ⟨D⟩, the evaluation unit 36 checks the relevant change vectors D in a quality check prior to the determination of the centers of gravity of change ⟨D⟩ based on at least the quality criteria specified below:

- the number of fine adjustments assigned to the respective change vector D exceeds a predefined limit value (of e.g. one fine adjustment);
- the improvement in the listening comprehension of the user assigned to the respective change vector D and determined if necessary through comparison of the test results from listening comprehension tests exceeds a predefined limit value during the familiarization phase.

In this case, the evaluation unit 36, in determining the center of gravity of change ⟨D⟩, takes into account only those change vectors D which fulfil at least one of the checked quality criteria.

Similarly in order to improve the meaningfulness of the centers of gravity of change ⟨D⟩, the evaluation unit 36 filters the change vectors D relevant to a specific language or language group according to at least one further filter criterion, for example:

- according to the position of the final setting $P_{end}$ or initial setting $P_{in}$ in the parameter space defined by the signal processing parameters $p_i$,
- the age of the user,
- the gender of the user,
- the type and/or severity of the hearing loss,
- the untreated time period of the user, and/or
- the musical training of the user.

In this case, the evaluation unit 36, in determining the center of gravity of change ⟨D⟩, takes into account only those change vectors D which fulfil the at least one filter criterion, i.e., for example:

- in terms of the position of the final setting $P_{end}$ or initial setting $P_{in}$, are located in a specific region of the parameter space,
- are assigned to a specific age range, a specific gender, a specific degree of musical training and/or a specific type and/or severity of the hearing loss, and/or
- in terms of the untreated time period of the user, lie within a predefined range.

In this case, the evaluation unit 36 preferably determines different centers of gravity of change ⟨D= which are assigned to different filter criteria, in particular to different regions of the parameter space, age groups, etc., for one and the same language or language group.

Similarly in order to improve the meaningfulness of the centers of gravity of change ⟨D=, the evaluation unit 36 checks the determined centers of gravity of change $\langle D \rangle$—additionally or alternatively to the prior quality check described above—in a subsequent quality check, in order to establish:

that the size of the respective center of gravity of change does not fall below a predefined minimum threshold, in particular by calculating the weighted amount $|\langle D \rangle|_w$ described above of the respective center of gravity of change (D) and comparing it with a predefined threshold value, and/or that the dispersion (i.e., the statistical variance) of the change vectors D taken into account in determining the respective center of gravity of change $\langle D \rangle$ does not exceed a predefined threshold value.

All determined centers of gravity of change $\langle D \rangle$ which do not fulfil the checked quality criterion (or at least one of possibly both checked quality criteria) are rejected by the evaluation unit 36 (and are therefore not further stored or used). The remaining centers of gravity of change $\langle D \rangle$ which fulfil the or each checked quality criterion in a subsequent quality check are stored by the evaluation unit 36 in the language adjustment database 38.

The second adjustment unit 40 is essentially identical to the first adjustment unit 32 and is used in the same way as the latter for the individual adjustment of the signal processing of new hearing systems 2 according to the needs of the respective user. It first creates-essentially in the same way as the adjustment unit 32—an initial adjustment $P_{in}$ of the signal processing parameters $p_i$ of the respective hearing system 2 which it modifies in one or more fine adjustment steps to produce a final adjustment $P_{end}$.

However, in contrast to the adjustment unit 32, the adjustment unit 40 takes into account the language spoken or heard by the user by selecting a suitable center of gravity of change $\langle D \rangle$, if available, from the language adjustment database 38 on the basis of a language indicator and optionally further details relating to the user (such as e.g. age, gender, etc.). The adjustment unit 40 creates the initial setting $P_{in}$ here in the same way as the adjustment unit 32, in particular using the same conventional adjustment model, by determining a language-unspecific default setting for the signal processing parameters $p_i$ and modifying this default setting by the selected center of gravity of change $\langle D \rangle$. The initial setting $P_{in}$ transferred in each case by the adjustment unit 40 to the assigned hearing instruments 2 is therefore already adjusted specifically to the language spoken or heard by the user, as a result of which an improved listening comprehension is achieved for the user even from the start of use.

In the implementation shown by way of example in FIG. 2, the adjustment units 32 and 40 and the evaluation unit 36 are designed in each case as a separate software and, if necessary, hardware unit. However, in further implementations of the invention, the adjustment units 32 and 40 can also be combined (together with or without the evaluation unit 36) in one software and, if necessary, hardware unit. In particular, the adjustment units 32 and 40 can be implemented as two different modes of operation of the same software and, if necessary, hardware unit. The databases 34 and 38 can also be implemented—as shown in FIG. 2—either as separate units or combined into one unit. A Alternatively, the adjustment units 32 and/or 40 can also be divided up into a plurality of subunits as distributed systems. Such subunits of the adjustment units 32 and/or 40 can be implemented, for example, in fitting stations which are operated remotely from one another by different acousticians. Alternatively or additionally, subunits of the adjustment units 32 and/or 40 can also be implemented as components of the respective operating app 6 of the hearing systems 2. In this case, the initial adjustment $P_{in}$ and the final adjustment $P_{end}$ are therefore determined by the respective hearing system 2 itself. Furthermore, the database 34 or the database 38 can also be divided again into subunits.

In a further design variant, the adjustment unit 40 determines the language-adjusted final setting $P_{end}$ in the form of a hearing program which is reversibly activatable (and correspondingly deactivatable also) during the operation of the hearing system 2 through user action or through an automatic classification of hearing situations. The respective language-specifically suitable center of gravity of change $\langle D \rangle$ influences the signal processing of the hearing system 2 only in the event of and during the activation of the hearing program concerned. In this case, the hearing system 2 can optionally also contain a plurality of hearing programs for different languages, with a facility to switch between them during the operation of the hearing system 2.

The adjustment of the signal processing of the hearing system 2 according to a specific language (or a plurality of languages in alternation) by means of the respective center of gravity of change $\langle D \rangle$ can also be performed here in the hearing system 2 itself during the live operation thereof.

Once more in an overview summary, the disclosure deals with a method and an associated device 30 for setting the signal processing of hearing systems 2, wherein each hearing system 2 in each case has at least one hearing instrument 4 which is parameterizable by means of a plurality of signal processing parameters $p_i$. An initial setting $P_{in}$ of the signal processing parameters $p_i$ is performed here in each case in the hearing systems 2 in a test group 42 of hearing systems 2, from which a final setting $P_{end}$ of the signal processing parameters $p_i$ is derived through single or multiple changing of the parameter setting. A change vector D in the parameter space defined by the signal processing parameters $p_i$ is determined from the difference between the final setting $P_{end}$ and the initial setting $P_{in}$ of the signal processing parameters $p_i$, wherein a language indicator characterizing a specific language is assigned to each change vector D. From change vectors D which are assigned to the same language or to a language group containing this language, a center of gravity of these change vectors D in the parameter space is determined as the center of gravity of change $\langle D \rangle$. This center of gravity of change $\langle D \rangle$ is used for a subsequent setting of one of the hearing systems 2 in the test group 42 or a further hearing system 2.

The invention is explained on the basis of the exemplary embodiments described above, but is in no way restricted thereto. Instead, further embodiments of the invention can be derived from the claims and the description above.

The following is a summary list of reference numerals and the corresponding structure used in the above description of the invention:

2 Hearing system
4 Hearing instrument
6 Operating app
8 Housing
10 Microphone
12 Receiver
14 Signal processor
16 Battery
18 Sound channel
20 Tip
22 Smartphone
24 Data communication connection
30 Device

32 (First) adjustment unit
34 Setting database
36 Evaluation unit
38 Language adjustment database
40 (Second) adjustment unit
42 Test group
$\langle D \rangle$ Center of gravity of change
$p_i$ Signal processing parameter
D Change vector
I Audio (input) signal
O Audio (output) signal
$P_{end}$ Final setting
$P_{in}$ Initial setting
U Operating voltage

The invention claimed is:

1. A method for setting the signal processing of hearing systems, wherein each of the hearing systems has at least one hearing instrument that is parameterizable by way of a plurality of signal processing parameters, the method comprising:

carrying out an initial setting of the signal processing parameters in the hearing systems within a test group of the hearing systems;

deriving a final setting of the signal processing parameters in each of the hearing systems within the test group through single or multiple changing of the parameter setting;

determining a change vector in a parameter space defined by the signal processing parameters from a difference between the final setting and an initial setting of the signal processing parameters;

assigning a language indicator characterizing a specific language to each change vector;

from change vectors which are assigned in accordance with the associated language indicator to the same language or to a language group containing that language, determining a center of gravity of these change vectors in the parameter space as a center of gravity of change; and using the center of gravity of change for a subsequent setting of one of the hearing systems in the test group or a further hearing system.

2. The method according to claim 1, which comprises taking the center of gravity of change into account in the initial setting of a new hearing system.

3. The method according to claim 1, which comprises taking into account the center of gravity of change in a language-specific hearing program which is reversibly activatable automatically or on request of a user during the operation of the hearing system.

4. The method according to claim 1, wherein a plurality of hearing programs that are respectively assigned to different languages are stored in the hearing system and are activatable alternately on request of a user or automatically during an operation of the hearing system, and wherein a center of gravity of change in each case specific to the respective language is taken into account.

5. The method according to claim 1, which comprises taking into account only those change vectors that are based on identical or similar initial settings or final settings of the signal processing in calculating the center of gravity of change.

6. The method according to claim 1, which comprises:

assigning at least one indicator of a user characteristic to each change vector, and selecting the at least one indicator from the group consisting of:

an indicator of a time period of an untreated hearing loss of the user before a use of a hearing system;

an indicator of an age of the user;

an indicator of a gender of the user; and an indicator of a musical training of the user;

and taking into account only those change vectors which correspond to each assigned user characteristic in calculating the center of gravity of change.

7. The method according to claim 1, which comprises taking into account the center of gravity of change in a subsequent setting of one of the hearing systems in the test group or a further hearing system only the center of gravity of change does not fall below a minimum threshold.

8. The method according to claim 7, wherein the center of gravity of change is not taken into account in the subsequent setting if the amount of the center of gravity of change falls below a predefined minimum value.

9. The method according to claim 1, which comprises:

determining a dispersion of the change vectors from which the center of gravity of change was calculated; and taking into account the center of gravity of change in a subsequent setting of one of the hearing systems in the test group or a further hearing system only if the dispersion does not exceed a predefined maximum value.

10. The method according to claim 1, which comprises:

storing a respective initial setting, a respective final setting, and the language indicator in a central database for all hearing systems in the test group; and calculating the change vector in a cloud server for each hearing system in the test group.

11. The method according to claim 10, which comprises storing the respective initial setting, the respective final setting, and the language indicator in a data cloud.

12. The method according to claim 1, which comprises adopting a current setting of the signal processing parameters as the final setting for each hearing system in the test group if the current setting of the signal processing parameters undergoes no further modification over a predefined time period.

13. A device for setting the signal processing of hearing systems, wherein each hearing system has at least one hearing instrument that is parameterizable by way of a plurality of signal processing parameters, the device comprising:

at least one adjustment unit for carrying out an initial setting of the signal processing parameters of each hearing system in a test group of the hearing systems, and for carrying out a final setting of the signal processing parameters of each hearing system in the test group through single or multiple changing of the signal processing parameters;

an evaluation unit for determining a change vector in the parameter space defined by the signal processing parameters from the difference between the final setting and the initial setting of the signal processing parameters, wherein a language indicator characterizing a specific language is assigned to each change vector;

said evaluation unit being configured to determine, from change vectors which are assigned in accordance with the associated language indicator to the same language or to a language group containing the language, a center of gravity of the change vectors in the parameter space as a center of gravity of change; and said adjustment unit, or a further adjustment unit of the device, being configured to use the center of gravity of change in a subsequent setting of one of the hearing systems in the test group or of a further hearing system.

* * * * *